United States Patent [19]

Bell

[11] Patent Number: 5,771,595
[45] Date of Patent: Jun. 30, 1998

[54] SCOPE TUBE ADJUSTING AND LOCKING DEVICE

[75] Inventor: Dennis L. Bell, Greeley, Colo.

[73] Assignee: Burris Company, Inc, Greeley, Colo.

[21] Appl. No.: 874,169

[22] Filed: Jun. 13, 1997

[51] Int. Cl.[6] .................................................. F41G 1/38
[52] U.S. Cl. ................................ 33/248; 33/245; 33/246
[58] Field of Search ............................ 33/248, 245, 246;
42/101

[56] References Cited

U.S. PATENT DOCUMENTS

| | | | |
|---|---|---|---|
| 1,641,019 | 8/1927 | Woods | 33/245 |
| 3,008,237 | 11/1961 | Harris | 33/50 |
| 3,121,163 | 2/1964 | Rickert | 250/77 |
| 3,161,716 | 12/1964 | Burris et al. | 88/32 |
| 3,513,549 | 5/1970 | Smiley | 33/50 |
| 3,642,341 | 2/1972 | Seifried | 350/10 |
| 3,962,795 | 6/1976 | Ross | 33/246 |
| 3,986,285 | 10/1976 | Krisay | 42/1 ST |
| 3,990,155 | 11/1976 | Akin, Jr. et al. | 33/247 |
| 4,247,161 | 1/1981 | Unertl, Jr | 350/10 |
| 4,584,776 | 4/1986 | Shepherd | 33/246 |
| 4,945,646 | 8/1990 | Ekstrand | 33/245 |
| 5,181,323 | 1/1993 | Cooper | 33/245 |
| 5,363,559 | 11/1994 | McCarty | 33/246 |

*Primary Examiner*—Charles T. Jordan
*Assistant Examiner*—Meena Caelliah
*Attorney, Agent, or Firm*—Michael A. Capraro

[57] ABSTRACT

A scope tube adjusting and locking device for adjusting the elevation and windage of sighting scope is comprised of a first adjusting means, a second adjusting means, a plurality of bias means, and a plurality of inner tube adjusting means. The adjusting means rotatably encompass the scope outer tube and have a bias means channel eccentrically formed therein. The plurality of bias means contact and track the base of the bias means channels and are rotatably cradled by the plurality of inner tube adjusting means which are laterally and movably disposed through the scope outer tube and which contact the inner guide tube. As the adjusting means are rotated around the scope outer tube, the plurality of inner tube adjusting means adjusts the elevation and windage of the inner guide tube. A locking means threadedly encompasses the scope outer tube and can be rotated to lock or unlock the adjusting means.

20 Claims, 5 Drawing Sheets

SCOPE TUBE ADJUSTING AND LOCKING DEVICE

BACKGROUND OF THE INVENTION

This invention relates generally to sighting scope locking devices and more specifically to a new and novel scope tube adjusting and locking device. The new and novel scope tube adjusting and locking device is designed to be used with a variety of sighting scopes used on prior art firearms such as rifles, shotguns, black-powder weapons and handguns. The new and novel scope tube adjusting and locking device is further designed to allow quick and easy adjustment of the sighting scope inner guide tube and then to positively lock the inner guide tube in the adjusted position while eliminating thread backlash, raised turrets and springs.

It is often desirable to mount a sighting scope on prior art firearms, such as rifles, shotguns, black-powder weapons and handguns, to aid the user in aiming at and precisely hitting a target when firing the firearm. The sighting scope is generally mounted on the firearm above, and longitudinally aligned with, the barrel of the firearm and defines an aiming point coincident with the point of impact of a projectile, such as a bullet, on a target. This is achieved by adjusting the vertical and horizontal position of an inner guide tube and its erector lenses, the inner guide tube being longitudinally disposed in an outer scope tube. Adjustment of the inner guide tube within the scope outer tube changes the actual or apparent position of a reticle, the reticle being viewed through a scope eyepiece to define the aiming point on a target. The reticle may be disposed in the inner guide tube or in the scope outer tube adjacent to an end of the inner guide tube. The reticle generally takes the form of a crosshair, dot, or post, but other types of reticles may also be used. A variety of optical lenses are also present in the scope outer tube which aid in seeing the target and which may magnify the intended target.

Prior to using a long gun or handgun, for target shooting or hunting, with the aid of a sighting scope attached thereto, the scope must sighted in or zeroed. That is, the vertical and horizontal position of the reticle, as viewed through the scope eyepiece, must be adjusted to compensate for elevational and lateral mis-alignment of the scope in relation to the longitudinal axis of the firearm barrel, distance to the target, ballistic characteristics of particular ammunition and other factors. This is accomplished by adjusting the elevation, or vertical position, and windage, or horizontal position, of the end of the inner guide tube housing the reticle.

While there are a wide variety of elevation and windage adjustment devices, and variations of elevation and windage adjusting devices, design problems in prior art scope elevation and windage adjustment devices present several disadvantages. Prior art adjusting devices typically employ two adjusting screws which act against the inner guide tube. The elevation adjustment screw is vertically oriented through the top surface of the scope outer tube, while the windage adjustment screw is horizontally oriented through a side of the scope outer tube. The inner guide tube is held against the ends of the adjustment screws by a spring bias positioned opposite the adjustment screws. Other types of prior art adjustment devices employ two spring biases, one positioned opposite the elevation adjustment screw and another positioned opposite the windage adjustment screw. For a more detailed discussion of prior art adjustment screw construction, reference should generally be made to the patents cited herein and specifically to the applicant's U.S. Pat. No. 3,161,716, issued on Dec. 15, 1964, to D. J. Burris et al.

Prior art adjustment screw construction is also shown in the U.S. Pat. No. 3,008,237, issued on Nov. 14, 1961, to H. N. Harris; the U.S. Pat. No. 3,642,341, issued on Feb. 15, 1972, to P. Seifried; and the U.S. Pat. No. 4,584,776, issued on Apr. 29, 1986, to D. R. Shepherd. It is also known to provide sighting scopes having one adjustment screw which is spring biased by a single bias spring as shown in the U.S. Pat. No. 3,121,163, issued on Feb. 11, 1964, to G. E. Rickert.

While these types of prior art constructions may be suitable for some purposes, design problems in prior art scope elevation and windage adjustment devices present several disadvantages. That is, they do not recognize the problems inherent in the use of a bias spring acting against a set of adjustment screws. Once the adjustment screws are set to a desired position to zero the sighting scope, the spring bias may not be sufficient to hold the adjusted vertical and horizontal position of the inner guide tube in place. The sighting scope can then become mis-aligned from the target and must be re-zeroed.

These types of adjustment configuration are susceptible to mis-alignment when the scope is subjected to intense recoil. This type of mis-alignment generally occurs from repeated discharge of the firearm, the discharge causing heavy recoil that can displace the previously set inner guide tube position. Recoil of the firearm can also cause backlash in the threads of the adjustment screws which is not always overcome by the bias spring acting on the adjustment screws. Additionally, accidental dropping or jarring of the firearm or the sighting scope may change the adjustment screw settings causing mis-alignment of the vertical and horizontal position of the inner guide tube.

Some prior art adjusting devices attempt to overcome this problem by providing a another type of prior art elevation and windage adjustment construction having a biased locking means. The biased locking means opposes the elevation and windage adjustment screws and is comprised of a tube biasing means used in combination with a bias spring, usually a coil spring, and tube biasing locking means. The bias spring presses against the tube biasing means which urges the inner guide tube against the elevation and windage adjustment screws. Once the scope is zeroed, the tube biasing locking means inactivates the bias spring and holds the inner guide tube in position against the two adjustment screws. While this arrangement holds the inner guide tube in a three point locked position and minimizes the effect of backlash on the adjustment screws, it requires multiple moving parts and springs which are subject to wear and mis-alignment under heavy recoil and harsh use of the firearm and is also subject to damage from accidental dropping or jarring of the scope. For a more detailed discussion of this type of adjustment screw construction, reference should made to the applicant's U.S. Pat. No. 5,363,559, issued on Nov. 15, 1994, to J. P. McCarty.

Additionally, prior art elevation and windage adjustment screws are typically housed in an area of the scope outer tube in a raised turret style and are generally covered by caps. The caps must be removed to access the adjustment screws which are then generally adjusted by using a screwdriver or other tool. This raised turret style often interferes with mounting rings used to mount a sighting scope to a firearm, necessitating the use of extension rings or extension bases to properly mount the scope on the firearm. That is, the sighting scope must be positioned on the firearm so that the eyepiece is properly positioned away from the user to prevent injury to the user that could be caused by recoil of the firearm while allowing the user to accurately sight the intended target through the scope. The position of the prior art raised turret style elevation and windage adjustment housing area on the scope outer tube often coincides with the position of the mounting rings when positioning the sighting scope on the firearm. Thus, extension rings or extensions bases must be used to shift the longitudinal position of the mounting rings, in relation to the position of the adjustment housing, to allow proper mounting of the scope on the firearm. The raised turret configuration also increases the risk of damage to the attached internal elevation and windage adjustment components used to move an inner guide tube if the sighting scope is accidentally dropped, and can hang up on clothing, gun straps, sand bags, tree branches or underbrush and other objects causing damage to the adjustment housing and the internal elevation and windage adjustment components or damage to those objects.

SUMMARY OF THE INVENTION

To overcome the before described considerations and problems inherent in and encountered with prior art scope elevation and windage adjustment devices, there is provided by the subject invention a unique scope tube adjusting and locking device that eliminates thread backlash, raised turrets and springs, while holding the inner guide tube in the desired vertical and horizontal position. The new and novel scope tube adjusting and locking device is further designed to allow quick and easy adjustment of the sighting scope inner guide tube and then to positively lock the inner guide tube in the adjusted position.

Typical sighting scopes have various optical lenses and a reticle arranged inside a scope outer tube, and some sighting scopes may also have a power adjusting ring, which allows the user to vary the effective magnification or power of the scope. Various mechanical devices are also located inside the scope outer tube that move and adjust some of the optical lenses and the reticle during sighting in or scope zeroing procedures. One of the mechanical devices located inside the scope outer tube is an inner guide tube which is pivotally attached to the inside of the scope outer tube and which may also house a reticle. The vertical and horizontal position of the inner guide tube is adjusted by moving one end of the guide tube while the opposite end of the guide tube remains pivotally attached to the inner surface of the outer tube. In typical sighting scopes, the inner guide tube is pivotally attached to the inside of the scope outer tube so that the pivotally attached opposite end of the inner guide tube is positioned adjacent to the scope eyepiece.

In the Preferred Embodiment, the inner guide tube is pivotally attached to the inside of the scope outer tube so that the pivotally attached opposite end of the inner guide tube is positioned away from the scope eyepiece and the pivotally movable end is positioned near the eyepiece. This arrangement allows the scope tube adjusting and locking device to be positioned on the scope outer tube near the eyepiece and also allows the scope tube adjusting and locking device to contact the inner guide tube at the most effective adjusting area on the inner guide tube, thereby increasing the accuracy of adjustment of the inner guide tube and thus, increasing the aiming accuracy of the sighting scope.

The new and novel scope tube adjusting and locking device is designed to be used with a variety of sighting scopes used on prior art firearms such as rifles, shotguns, black-powder weapons and handguns, and is comprised of a first adjusting means, a second adjusting means, a plurality of bias means, and a plurality of inner tube adjusting means. The first and second adjusting means rotatably encompass the scope outer tube and have a bias means channel eccentrically formed therein. The bias means channel is eccentrically formed in the inner surface of the first adjusting means and the second adjusting means so that the bias means channel opens toward the scope outer tube. The plurality of inner tube adjusting means are laterally and movably disposed through bores laterally formed in the scope outer tube so that an end of the inner tube adjusting means contacts the inner guide tube. The bores laterally formed through the scope outer tube are oriented so that two bores oppose one another in a vertical plane and another two bores oppose one another in a horizontal plane, the horizontal bores being longitudinally positioned adjacent to the vertical bores. Thus, two opposing inner tube adjusting means are vertically oriented and two opposing inner tube adjusting means are horizontally oriented through the scope outer tube. The inner guide tube is longitudinally disposed through the scope outer tube between the vertical opposing inner tube adjusting means and between the horizontal opposing inner tube adjusting means. The plurality of bias means are rotatably cradled by an opposite end of the plurality of inner tube adjusting means, so that the plurality of bias means contact and track the base of the bias means channels formed in the adjusting means as the adjusting means are rotated around the scope outer tube. A locking means threadedly encompasses the scope outer tube and can be rotated to lock or unlock the adjusting means.

Rotation of the adjusting means around the scope outer tube causes the plurality of bias means to track the eccentric bias means channels, the plurality of bias means then causing the plurality of inner tube adjusting means to move vertically or horizontally in the bores formed in the scope outer tube. Since the inner guide tube is longitudinally disposed through the scope outer tube between the vertical opposing inner tube adjusting means and the horizontal opposing inner tube adjusting means, the vertical and horizontal position of the inner guide tube is changed by the rotation of the adjusting means. Once the desired vertical and horizontal adjustment of the inner guide tube has been achieved, the locking means is tightened, or rotated to a locking position, to positively lock the inner guide tube in the desired adjusted position. The locking means can also be loosened, or rotated to an unlocking position, to re-adjust the vertical and horizontal position of the inner guide tube if necessary.

A retaining seat is formed on the scope outer tube adjacent to the first adjusting means, an outer edge of the first adjusting means contacting the retaining seat. An opposite inner edge of the first adjusting means contacts an edge of an expansion means which encompasses the scope outer tube and is positioned between the first adjusting means and the second adjusting means. An opposite edge of the expansion means contacts an inner edge of the second adjusting means while an opposite outer edge of the second adjusting means contacts an edge of a locking ring. An opposite edge of the locking ring contacts the locking means threadedly encompassing the scope outer tube. When the locking means is tightened, or rotated to move toward a locking position, it applies pressure against the locking ring which in turn applies pressure against the second adjusting means, the second adjusting means then applying pressure against the expansion means, which in turn applies pressure against the first adjusting means, the first adjusting means then applying pressure against the retaining seat.

Once the locking means has been tightened, the pressure created the between locking means and the retaining seat locks the adjusting means in place and prevents rotation of the adjusting means. Thus, the vertical position, or elevation, of the inner guide tube and the horizontal position, or windage, of the inner guide tube, are locked in the desired position. When the locking means is loosened or rotated to move toward an unlocked position, the pressure against all of the intervening components between the retaining seat and the locking means is relieved and the adjusting means can again be rotated to adjust or re-adjust the elevation and windage of the inner guide tube.

A plurality of adjusting means seals may also be circumferentially disposed around the scope outer tube in a plurality of spaced apart seal channels circumferentially formed in the outer surface of the scope outer tube. The adjusting means seals are positioned to contact the inner surface of the adjusting means on either side of the bias means channels. The adjusting means slightly compresses the plurality of adjusting means seals in the seal channels thereby providing efficient sealing of the internal components of the scope tube adjusting and locking device.

Since the locking means threadedly encompasses the scope outer tube and the adjusting means rotatably encompass the scope outer tube, the locking means and the adjusting means are naturally oriented perpendicular to the longitudinal axis of the sighting scope and thus, to the longitudinal axis of the firearm barrel. Therefore, detrimental backlash on the locking means and on the adjusting means is eliminated. Backlash is the result of recoil traveling in a generally longitudinal direction down the length of the firearm and can cause mis-alignment of the inner guide tube. Also, since the new and novel scope tube adjusting and locking device does not employ springs as a bias means, wear on the bias means caused by intense recoil of the firearm is eliminated.

Additionally, because the adjusting means and the locking means rotatably encompass the scope outer tube, all locking and adjusting components are readily accessible, unlike the prior art adjustment devices which require the removal of caps and the use of screwdrivers or other tools to turn the adjusting screws. Since the adjusting means and the locking means are designed to have a low profile, the new and novel scope tube adjusting and locking device does not protrude from the outer tube in a raised turret style, unlike the prior art adjustment construction. Thus, the low profile and positioning of the scope tube adjusting and locking device prevents the scope tube adjusting and locking device from interfering with the mounting rings used to mount a sighting scope to a firearm. Also, damage to the scope tube adjusting and locking device and its internal components is eliminated should the sighting scope be accidentally dropped, and the scope tube adjusting and locking device will not hang up on clothing, gun straps, sand bags, tree branches or underbrush and other objects.

To achieve the foregoing and other advantages, the present invention provides a new and novel scope tube adjusting and locking device that positively locks the inner guide tube in an adjusted position while eliminating thread backlash, raised turrets and springs, and allows quick and easy adjustment of the sighting scope inner guide tube.

The more important features of the present invention have been broadly outlined in order that the detailed description thereof that follows may be better understood and in order that the present contribution to the art may be better appreciated. There are additional features of the invention that will be more fully described hereinafter and which, together with the features outlined above, will form the subject matter of the claims appended hereto. Those skilled in the art will appreciate that the conception, upon which the present disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory review the nature and essence of the technical disclosure of the application. The abstract is neither intended to define the invention of the application, which is measured by the claims, nor is it intended to be limiting as to the scope of the invention in any way.

Accordingly, it is an object and advantage of the invention to provide a new and novel scope tube adjusting and locking device that positively locks the inner guide tube in a desired position within a sighting scope.

Another object and advantage of the invention is to provide a new and novel scope tube adjusting and locking device that eliminates the detrimental effects of thread backlash on the inner guide tube adjusting components.

Another object and advantage of the invention is to provide a new and novel scope tube adjusting and locking device that securely and easily locks the adjusting components in a desired position.

Another object and advantage of the invention is to provide a new and novel scope tube adjusting and locking device that eliminates mis-alignment of the inner guide tube caused by accidental dropping or jarring of the sighting scope.

Another object and advantage of the invention is to provide a new and novel scope tube adjusting and locking device having bias means that are not susceptible to wear caused by repeated discharging of a firearm.

Another object and advantage of the invention is to provide a new and novel scope tube adjusting and locking device that does not interfere with the scope mounting rings.

Another object and advantage of the invention is to provide a new and novel scope tube adjusting and locking device that increases the accuracy of adjustment of the inner guide tube.

Still another object and advantage of the invention is to provide a new and novel scope tube adjusting and locking device which may be easily and efficiently manufactured and marketed.

Yet another object and advantage of the invention is to provide a new and novel scope tube adjusting and locking device which is of durable and reliable construction.

These and other objects and advantages will become apparent from review of the drawings and from a study of the Description of the Preferred Embodiment relating to the drawings which has been provided by way of illustration only.

DESCRIPTION OF THE PREFERRED EMBODIMENT

Referring to the drawings in general, the present description is given in the context of the new and novel scope tube adjusting and locking device as utilized with a prior art firearm. It will be readily apparent to those skilled in the art that the usefulness of the present invention is not limited to this application and that changes could be made in construction and should be considered to be within the spirit and scope of the present invention.

Figure 1:
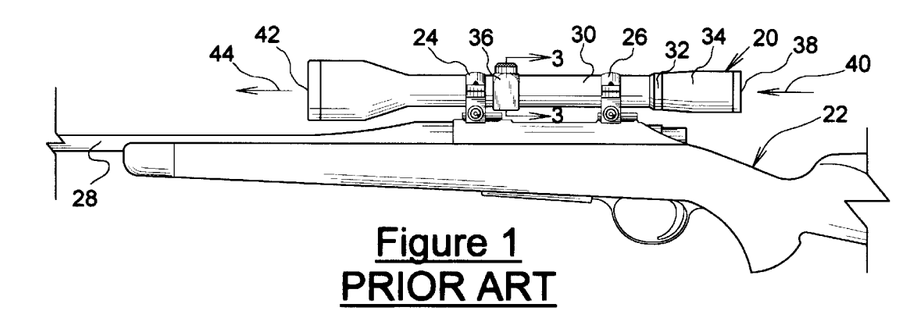
FIG. 1 is a side view of a typical sighting scope in position on a prior art rifle.

Referring now in particular to FIG. 1 of the drawings, there is shown a typical sighting scope, shown generally by the numeral 20, in position on a prior art firearm, shown generally by the numeral 22. The prior art firearm 22 is shown as a rifle in FIG. 1 of the drawings for purposes of illustration only. The sighting scope 20 is attached to the prior art rifle by scope mounts 24 and 26 and longitudinally aligned with the barrel 28 of the prior art firearm 22. Various optical lenses and a reticle are arranged inside the scope outer tube 30, the reticle generally taking the form of a cross-hair, dot or post for aligning the barrel 28 of a prior art firearm 22 with a target. Some sighting scopes may also have a power adjusting ring 32, which allows the user to vary the effective magnification or power of the scope. Various mechanical devices are also located inside the scope outer tube 30 that move and adjust some of the optical lenses and the actual or apparent position of the reticle, when the reticle is viewed through a scope eyepiece 34, during sighting in or scope zeroing procedures.

One of the mechanical devices located inside the scope 20 is an inner guide tube which may be moved by adjustment screws located in an adjustment housing 36 formed as part of the outer tube 30. The actual or apparent vertical and horizontal position of the reticle, which may be located inside the inner guide tube or in the scope outer tube 30 adjacent to the inner guide tube, is adjusted by moving one end of the guide tube while the opposite end of the guide tube remains pivotally attached to an inner surface of the outer tube 30. The inner guide tube, reticle, adjustment screws and inner guide tube attachment devices can not be seen in FIG. 1 but are clearly illustrated in other drawing views.

A sighting scope is zeroed by first sighting a target through the eyepiece 34 at the end 38 of the scope 20 in the direction of the arrow 40 and out the opposite end 42 of the scope 20 in the direction of the arrow 44. A test firing of the prior art firearm 22 is then made and the location of the projectile hit on a target is noted. Adjustment screws located in the adjustment housing 36 are then rotated to make any necessary adjustments for elevation and windage correction. Elevation adjustment moves the vertical angle or vertical position of the inner guide tube, while windage adjustment moves the horizontal angle or horizontal position of the inner guide tube. Since the reticle may be located in the inner guide tube, or adjacent to the end of the inner guide tube, elevation and windage adjustment of the inner guide tube moves the apparent vertical and horizontal position of the reticle, with respect to the target, thereby allowing the firearm to be zeroed. Several test firings of the firearm followed by adjustment of the inner guide tube may be necessary to correctly zero a sighting scope on a prior art firearm. The variable power sighting scope 20 is shown in FIG. 1 of the drawings for purposes of illustration only.

Figure 2:
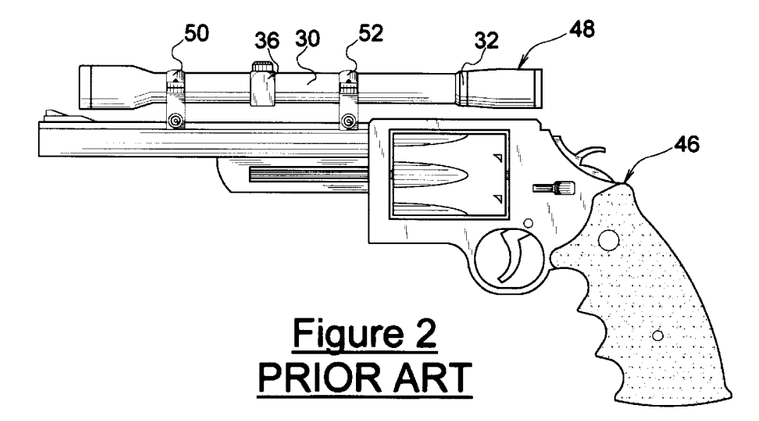
FIG. 2 is a side view of a typical sighting scope in position on a prior art handgun.

Referring now to FIG. 2 of the drawings, there is shown a side view of a prior art handgun, shown generally by the numeral 46. The prior art handgun 46 is shown as a revolver in FIG. 2 of the drawings for purposes of illustration only. A handgun sighting scope, shown generally by the numeral 48, is mounted to the prior art handgun 46 by scope mounts 50 and 52. The handgun sighting scope 48 may also have a power adjusting ring 32. Various optical lenses and a reticle are also arranged inside the handgun scope outer tube 30 as well as various mechanical devices inside to move and adjust some of the optical lenses and the reticle during sighting in or zeroing procedures.

Elevation and windage adjustment screws are positioned in an adjustment housing 36 formed as part of the scope outer tube 30 as in the long gun or rifle scope. The handgun sighting scope 48 is sighted in or zeroed in a manner similar to the rifle scope by sighting through the handgun sighting scope 48 toward a target and performing several test firings followed by vertical and horizontal adjustment of the inner guide tube. The variable power handgun sighting scope 48 is shown in FIG. 2 of the drawings for purposes of illustration only.

Figure 3:
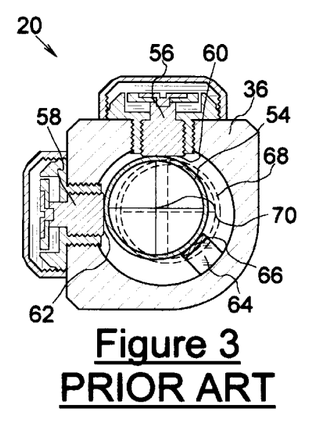
FIG. 3 is a cross sectional view of a typical sighting scope taken along lines 3—3 of FIG. 1 showing typical prior art adjustment construction having one spring force or bias.

Referring now to FIG. 3 of the drawings, there is shown a cross sectional view of a typical sighting scope 20, taken along lines 3—3 of FIG. 1. FIG. 3 illustrates typical prior art elevation and windage adjustment construction used to move an inner guide tube 54. Adjustment screws 56 and 58 are threadedly disposed through adjustment housing 36, the adjustment screw 56 controlling the elevation or vertical positioning of the inner guide tube 54 and the adjustment screw 58 controlling the windage or horizontal positioning of the inner guide tube 54. The view illustrated in FIG. 3 is also typical for a prior art handgun sighting scope 48 shown in FIG. 2 of the drawings.

Still referring to FIG. 3 of the drawings, it can be seen how the ends 60 and 62 of the adjustment screws 56 and 58, respectively, engage the inner guide tube 54 against the opposing action of a spring force or bias 64 which presses against or grounds on the inner guide tube 54 at the position 66 as illustrated. In prior art devices of the type shown in FIG. 3, the spring force or bias 64 may be a leaf spring, a coil spring or other bias means known in the art. Rotation of the adjustment screws 56 and 58 causes the ends 60 and 62, respectively, to move the inner guide tube 54, vertically and horizontally, to a desired position such as the position 68, as shown in dashed lines. Vertical and horizontal adjustment of the inner guide tube 54 moves an internal lens system contained within the inner guide tube 54. Thus, if the reticle 70 is attached to the inner guide tube 54 as shown in FIG. 3, the actual vertical and horizontal position of the reticle 70 is changed. If the reticle 70 is located adjacent to the inner guide tube 54, the vertical and horizontal adjustment of the inner guide tube 54 causes the apparent vertical and horizontal position of the reticle 70 to change when the reticle 70 is viewed through the scope eyepiece 34, the scope eyepiece 34 not shown in FIG. 3 but clearly shown in FIGS. 1, 2, 6, 7 and 8 of the drawings. The reticle 70 is shown attached to the inner guide tube 54 and is shown as a cross-hair in the drawings for purposes of clarity.

Figure 4:
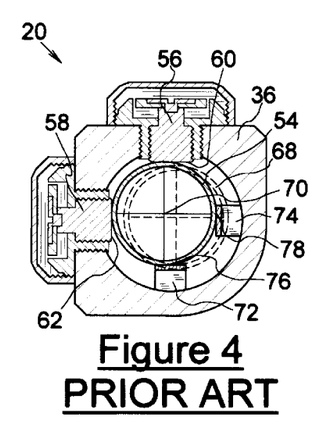
FIG. 4 is a cross sectional view of a typical sighting scope similar to FIG. 3 showing typical prior art adjustment construction having two spring forces or biases.

Referring now to FIG. 4 of the drawings, there is shown a cross sectional view of a typical sighting scope having two spring forces or biases 72 and 74. A dual spring force bias augments the opposing force on the inner guide tube 54 against the adjustment screws 56 and 58 by providing force or bias at the two points 76 and 78, respectively. The additional spring force can operate to aid in holding the properly adjusted inner guide tube 54 in it's desired position under normal conditions. However, the use of a single or dual spring force does not provide sufficient holding ability when the firearm may be accidentally dropped or jarred. Also, the use of a single or dual spring force does not prevent movement of the inner guide tube 54 from repeated heavy recoils of the firearm using high powered ammunition, or in the case of air guns, the action of the spring that operates the air gun plunger or pistons.

Figure 5:
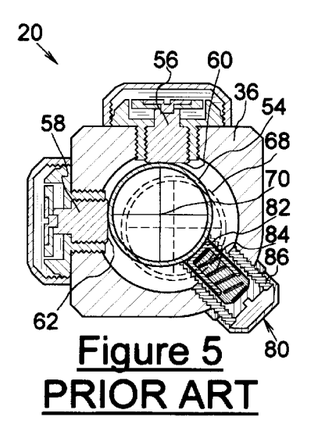
FIG. 5 is a cross sectional view of a typical sighting scope similar to FIG. 3 showing typical prior art adjustment construction having a biased locking means.

Referring now to FIG. 5 of the drawings, there is shown another type of prior art elevation and windage adjustment construction having a biased locking means, shown generally by the numeral 80. The biased locking means 80 is positioned in the adjustment housing 36 to oppose the prior art elevation and windage adjustment screws 56 and 58 and is comprised of a tube biasing means 82 used in combination with a bias spring 84 and tube biasing locking means 86. The bias spring 84 causes the tube biasing means 82 to urge the inner guide tube 54 against the elevation and windage adjustment screws 56 and 58, respectively, during the sighting in or zeroing procedure herein before described. Once the scope is zeroed, the tube biasing locking means 86 is operated to inactivate the bias spring 84 and to rigidly hold the inner guide tube 54 against the two adjustment screws 56 and 58. While this arrangement holds the inner guide tube 54 in a rigid three point locked position and minimizes the effect of backlash on the adjustment screws, it requires multiple moving parts and springs which are subject to wear and mis-alignment under heavy recoil and harsh use of the firearm and subject to damage from accidental dropping or jarring of the scope.

Prior art adjustment housings 36 of sighting scopes are generally a raised turret style as can be seen in FIGS. 1 through 5 of the drawings. This raised turret style interferes with the mounting rings used to mount a sighting scope to a firearm, such interference requiring the use of extension rings or extension bases to properly mount the scope on the firearm, as previously described. The raised configuration of the adjustment housing 36 also increases the risk of damage to the attached internal elevation and windage adjustment components used to move an inner guide tube 54 if the sighting scope is accidentally dropped, and can hang up on clothing, gun straps, sand bags, tree branches or underbrush and other objects causing damage to the adjustment housing and the internal elevation and windage adjustment components or damage to those objects.

Figure 6:
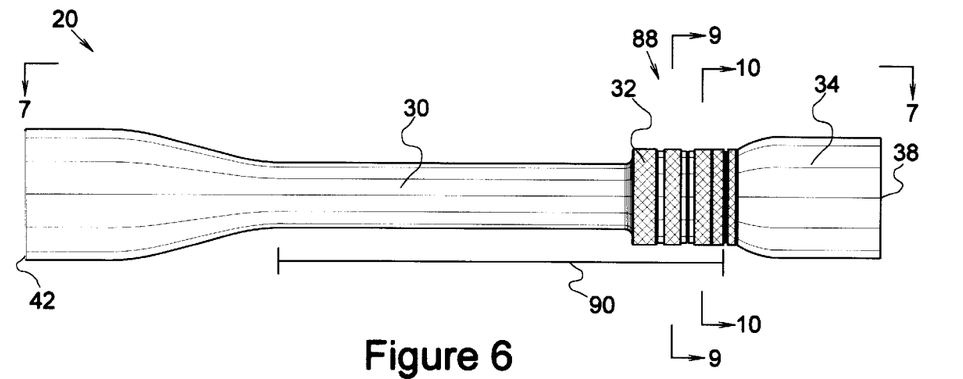
FIG. 6 is a side view of a sighting scope having the new and novel scope tube adjusting and locking device positioned thereon.

Referring now in general to FIGS. 6 through 12 of the drawings, there will be shown and described in detail the applicant's new and novel scope tube adjusting and locking device, shown generally by the numeral 88. Referring in particular to FIG. 6, there is shown a side view of a sighting scope 20, having an eyepiece 34, an end 38, an opposite end 42 and an outer tube 30. In the Preferred Embodiment and in FIG. 6 of the drawings, the new and novel scope tube adjusting and locking device 88 is located around the body 30 of the sighting scope 20 near the scope eyepiece 34. The scope tube adjusting and locking device 88 can also be positioned around the outer tube 30 at any point in the area shown by the distance 90, as will be discussed more fully hereinafter. Alternate positions along the scope outer tube 30 may also be used and are considered to be within the spirit and scope of the present invention.

FIG. 6 of the drawings also illustrates the low profile nature of the new and novel scope tube adjusting and locking device 88. Since the scope tube adjusting and locking device 88 does not protrude from the outer tube 30 in a raised turret style, unlike the prior art adjustment housing 36 shown previously, interference with mounting rings used to mount a sighting scope to a firearm is eliminated, thereby eliminating the need for extension rings or extension bases to properly mount the scope on the firearm. The low profile nature of the new and novel scope tube adjusting and locking device 88 also prevents damage to the scope tube adjusting and locking device 88 and its internal components should the sighting scope be accidentally dropped, and prevents the scope tube adjusting and locking device 88 from hanging up on clothing, gun straps, sand bags, tree branches or underbrush and other objects, thereby eliminating damage to the scope tube adjusting and locking device 88 and damage to those objects.

Figure 7:
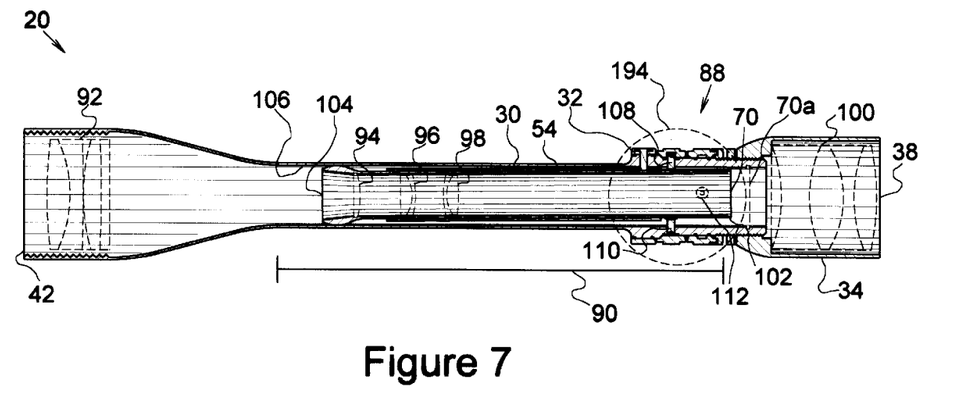
FIG. 7 is a cross sectional view of a sighting scope having the new and novel scope tube adjusting and locking device positioned thereon taken along lines 7—7 of FIG. 6.

Referring now to FIG. 7 of the drawings, there is shown a cross sectional view of the sighting scope 20 taken along lines 7—7 of FIG. 6 of the drawings. FIG. 7 illustrates possible placement of various lenses 92, 94, 96, 98, and 100 that may be part of the lens system present in the sighting scope 20. The various lenses are shown in dashed lines in FIG. 7 for purposes of clarity. A reticle 70, which generally provides an aiming reference point for aligning a firearm with a target, may be attached to the end 102 of the inner guide tube 54 as shown in FIG. 7. When the reticle 70 is attached to the end 102 of the inner guide tube 54, as shown in the drawings in general, vertical and horizontal adjustment of the inner guide tube 54 changes the actual vertical and horizontal position of the reticle 70. Alternatively, the reticle may be positioned in the scope outer tube 30 adjacent to the end 102 of the inner guide tube 54, as shown by the dashed line 70*a* in FIG. 7 of the drawings. In this arrangement, vertical and horizontal adjustment of the inner guide tube 54 and its associated erector lenses 94, 96 and 98, changes the apparent vertical and horizontal position of the reticle 70*a* when the reticle 70*a* is viewed through the eyepiece 34.

In the Preferred Embodiment, the opposite end 104 of the inner guide tube 54 is pivotally attached to the inner surface 106 of the scope outer tube 30 away from the scope eyepiece 34 and closer to the opposite end 42 of the sighting scope 20 as illustrated in FIG. 7. Thus, the pivotally movable end 102 of the inner guide tube 54 is oriented near the eyepiece 34 of the sighting scope 20. This arrangement allows the scope tube adjusting and locking device 88 to be positioned on the scope outer tube 30 near the eyepiece 34 and also allows the scope tube adjusting and locking device 88 to contact the inner guide tube 54 at the most effective adjusting area on the inner guide tube 54. That is, by positioning the scope tube adjusting and locking device 88 near the eyepiece 34 on the scope outer tube 30, the internal adjusting components of the scope tube adjusting and locking device 88 contacts the inner guide tube 54 at the pivotally movable end 102, thereby increasing the accuracy of adjustment of the inner guide tube 54 and thus, increasing the aiming accuracy of the sighting scope. Vertical and horizontal adjustment of the end 102 of the inner guide tube 54 is achieved by vertical and horizontal movement of a plurality of inner tube adjusting means 108, 110, 112 and 114, as will be discussed more fully hereinafter. The inner tube adjusting means 112 is shown in dashed lines in FIG. 7 for purposes of clarity and the inner tube adjusting means 114 cannot be seen in FIG. 7 but is clearly shown in FIGS. 10 and 12 of the drawings.

Figure 8:
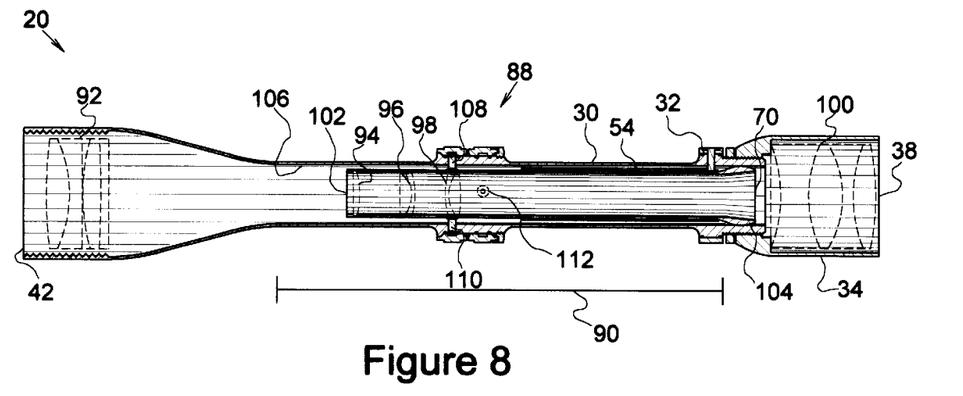
FIG. 8 is a cross sectional view similar to FIG. 7 showing an alternate position of the new and novel scope tube adjusting and locking device on the sighting scope.

Referring now to FIG. 8 of the drawings, there is shown a cross sectional view of a sighting scope 20 similar to FIG. 7 of the drawings. Since the inner guide tube 54, the various lens systems, and the associated mechanical adjusting components of the power adjusting ring 32, if present, can be positioned anywhere within the scope outer tube 30 along the distance shown by the numeral 90, the new and novel scope tube adjusting and locking device 88 can also be positioned along the outer tube 30 at any point in the area shown by the distance 90. One possible alternate position of the scope tube adjusting and locking device 88 is illustrated in FIG. 8. Other possible alternate positions and alternate guide tube, lens system, and power adjusting ring configurations known in the art may also be used and are considered to be within the spirit and scope of the present invention.

FIG. 8 also illustrates the typical prior art orientation of the inner guide tube 54 where the opposite end 104 of the inner guide tube 54 is pivotally attached to the inner surface 106 of the scope outer tube 30 near the eyepiece 34 of the sighting scope 20. Prior art pivotal attachment of the inner guide tube 54 to the inner surface 106 of the scope outer tube 30 requires that any elevation and windage adjustment devices used to adjust the vertical and horizontal position of the inner guide tube 54 be located on the scope outer tube 30 nearer to the opposite end 42 of the sighting scope 20 where they may interfere with scope mounting rings as previously described. Additionally, the prior art arrangement of the inner guide tube 54 decreases the adjusting accuracy and aiming accuracy of a sighting scope 20 because the reticle 70 is now positioned near the pivotal attachment of the inner guide tube 54 rather than being positioned near the movable end 102 of the inner guide tube 54, thereby affecting the degree of movement and thus, the accuracy, of the actual or apparent position of the reticle 70 when viewed through the scope eyepiece 34. When the inner guide tube 54 is arranged with the pivotal attachment away from the scope eyepiece 34, as shown in FIG. 7 of the drawings, the scope tube adjusting and locking device 88 can then be located near the eyepiece 34 of the sighting scope 20. This allows the scope tube adjusting and locking device 88 to contact the inner guide tube 54 at the pivotally movable end 102 of the inner guide tube 54, thereby increasing the accuracy of adjustment of the inner guide tube 54 and thus, increasing the aiming accuracy of the sighting scope.

Figure 9:
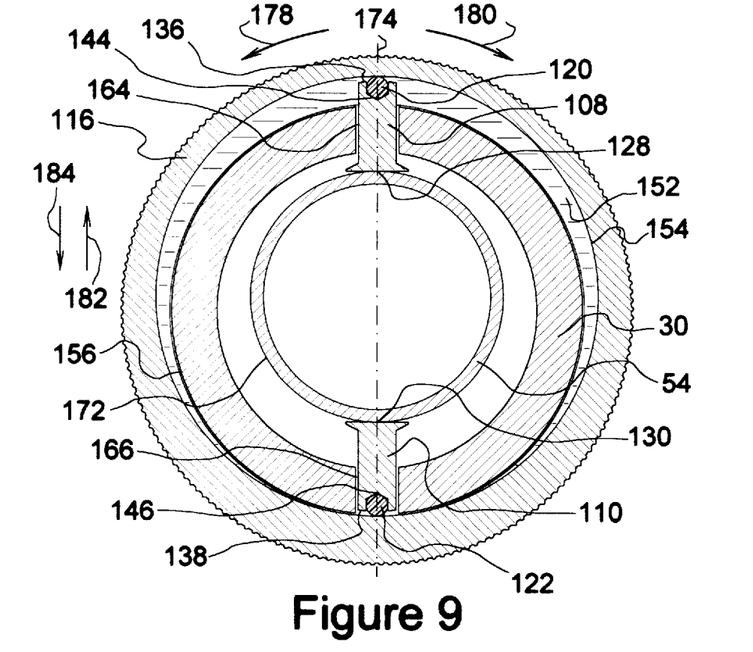
FIG. 9 is a cross sectional view of the new and novel scope tube adjusting and locking device taken along lines 9—9 of FIG. 6.
Figure 10:
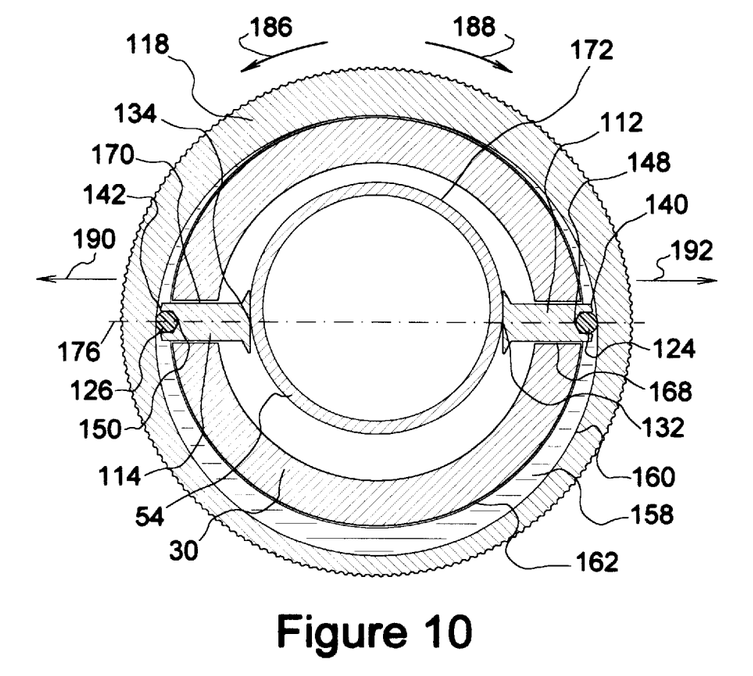
FIG. 10 is a cross sectional view of the new and novel scope tube adjusting and locking device taken along lines 10—10 of FIG. 6.

Referring now to FIGS. 9 and 10 of the drawings, there will be described the orientation and operation of the inner tube adjusting means 108, 110, 112 and 114. FIG. 9 is a cross sectional view taken along lines 9—9 of FIG. 6 and FIG. 10 is a cross sectional view taken along lines 10—10 of FIG. 6 of the drawings. The new and novel scope tube adjusting and locking device is comprised of a first adjusting means 116, a second adjusting means 118, a plurality of bias means 120, 122, 124 and 126, and a plurality of inner tube adjusting means 108, 110, 112 and 114, the plurality of inner tube adjusting means 108, 110, 112 and 114 having an end 128, 130, 132 and 134, respectively, and an opposite end 136, 138, 140 and 142, respectively. The bias means 120, 122, 124 and 126 are rotatably disposed in cradle means 144, 146, 148 and 150, respectively, the cradle means 144, 146, 148 and 150 being formed in the opposite end 136, 138, 140 and 142, respectively, of the inner tube adjusting means 108, 110, 112 and 114, respectively. A bias means channel 152, having a base 154 and opening toward the scope outer tube 30, is eccentrically formed in the inner surface 156 of the first adjusting means 116, and a bias means channel 158, also having a base 160 and opening toward the scope outer tube 30, is similarly eccentrically formed in the inner surface 162 of the second adjusting means 118.

In the Preferred Embodiment, the first adjusting means 116 and the second adjusting means 118 are first positioned around the scope outer tube 30, the first adjusting means 116 and the second adjusting means 118 rotatably encompassing the scope outer tube 30. The inner tube adjusting means 108 in conjunction with bias means 120, inner tube adjusting means 110 in conjunction with bias means 122, inner tube adjusting means 112 in conjunction with bias means 124, and inner tube adjusting means 114 in conjunction with bias means 126 are then laterally and movably disposed through bores 164, 166, 168 and 170, respectively, in the scope outer tube 30 so that the bias means 120 and 122 contact the bias means channel base 154 of the first adjusting means 116 and the bias means 124 and 126 contact the bias means channel base 160 of the second adjusting means 118. Finally, the inner guide tube 54 is longitudinally disposed through the scope outer tube 30, the outer surface 172 of the inner guide tube 54 pressing against the ends 128, 130, 132 and 134 of the inner tube adjusting means 108, 110, 112 and 114, respectively, causing the bias means 120 and 122 to be slightly compressed against the bias means channel base 154 of the first adjusting means 116 and the bias means 124 and 126 to be slightly compressed against the bias means channel base 160 of the second adjusting means 118.

Also in the Preferred Embodiment, the bias means 120, 122, 124 and 126 are generally spherical in shape and formed from a resilient material having an inherent memory such as nylon, Teflon®, polyethylene and other resilient plastic polymers and resilient plastic co-polymers. That is, the resilient nature of the bias means 120, 122, 124 and 126 urges the bias means to return to its original, non-compressed state, thereby causing the bias means to exert an outwardly radiating force which acts against the inner tube adjusting means 108, 110, 112 and 114, respectively, forcing the inner tube adjusting means back against the outer surface 172 of the inner guide tube 54. Unlike the prior art coil spring or leaf spring biasing means, the spherical construction and resilient nature of the bias means 120, 122, 124 and 126 provides a durable bias force of negative tolerance which helps absorb any recoil or backlash produced by the discharge of the firearm while maintaining a positive and accurate alignment of the inner guide tube 54 within the scope outer tube 30. Other resilient, memory inherent materials and other shapes may also be used and are considered to be within the spirit and scope of the present invention.

The opposing bores 164 and 166 are laterally formed through the scope outer tube 30 and the opposing bores 168 and 170 are similarly laterally formed through the scope outer tube 30 but being offset and perpendicular to the orientation of the opposing bores 164 and 166. That is, in the Preferred Embodiment, the opposing bores 164 and 166 are laterally disposed through the scope outer tube 30 and oriented in the vertical plane shown by the dot-dash line 174 in FIG. 9, while the opposing bores 168 and 170 are laterally disposed through the scope outer tube 30 adjacent to the bores 164 and 166 and oriented in the horizontal plane shown by the dot-dash line 176 in FIG. 10.

The bias means 120 and 122 contact the bias means channel base 154 of the first adjusting means 116, as previously described, and track the base 154 in the bias means channel 152 as the first adjusting means 116 is rotated in the direction of the arrow 178 or in the direction of the arrow 180. In the Preferred Embodiment, the inner tube adjusting means 108 and bias means 120 directly oppose the inner tube adjusting means 110 and bias means 122 in the vertical plane as shown in FIG. 9. The opposing biasing forces created by the bias means 120 and opposing bias means 122 urge the opposingly aligned inner tube adjusting means 108 and inner tube adjusting means 110 toward one another and against the outer surface 172 of the inner guide tube 54. Thus, the inner guide tube 54 is firmly held between the inner tube adjusting means 108 and inner tube adjusting means 110.

Since the bias means channel 152 is eccentrically formed in the first adjusting means 116, the depth of the bias means channel 152 varies around the inner circumference of the first adjusting means 116. Thus, rotation of the first adjusting means 116 in either the direction of the arrow 178 or the direction of the arrow 180 causes the bias means channel base 154 of the bias means channel 152 to force the bias means 120 and 122, and thus, inner tube adjusting means 108 and the inner tube adjusting means 110, to move in the direction of the arrow 182 or in the direction of the arrow 184. The depth of the bias means channel 152 where the bias means 120 and 122 contacts the bias means channel base 154 determines which direction the bias means 120 and 122, and thus, the inner tube adjusting means 108 and 110, will move.

For example, in FIG. 9 of the drawings, the bias means 120 contacts the bias means channel base 154 in the deep portion of the bias means channel 152 while the opposing bias means 122 contacts the bias means channel base 154 in the shallow portion of the bias means channel 152. If the first adjusting means 116 were rotated in either direction 178 or 180, the depth of the bias means channel 152 would decrease where the bias means 120 contacts the bias means channel base 154 and the depth of the bias means channel 152 would increase where the bias means 122 contacts the bias means channel base 154 thereby moving the bias means 120 and 122, and thus, the inner tube adjusting means 108 and 110, respectively, in the direction of the arrow 184. Therefore, vertical movement of the inner tube adjusting means 108 and 110 caused by the rotation of the eccentric bias means channel 152 formed in the first adjusting means 116 changes or adjusts the vertical position or elevation of the inner guide tube 54 within the scope outer tube 30, thereby adjusting the actual or apparent vertical position or elevation of the reticle. The reticle cannot be seen in FIG. 9 of the drawings but is clearly shown in FIGS. 3, 4 and 5 of the drawings and the end 102 of the inner guide tube 54 cannot be seen in FIG. 9 of the drawings but is clearly shown in FIGS. 7, 8 and 11 of the drawings.

Similarly, the bias means 124 and 126 contact the bias means channel base 160 of the second adjusting means 118, as previously described, and track the base 160 in the bias means channel 158 as the second adjusting means 118 is rotated in the direction of the arrow 186 or in the direction of the arrow 188. In the Preferred Embodiment, the inner tube adjusting means 112 and bias means 124 directly oppose the inner tube adjusting means 114 and bias means 126 in the horizontal plane as shown in FIG. 10. The opposing biasing forces created by the bias means 124 and opposing bias means 126 urge the opposingly aligned inner tube adjusting means 112 and inner tube adjusting means 114 toward one another and against the outer surface 172 of the inner guide tube 54. Thus, the inner guide tube 54 is firmly held between the inner tube adjusting means 112 and inner tube adjusting means 114. Since the bias means channel 158 is eccentrically formed in the second adjusting means 118, the depth of the bias means channel 158 varies around the inner circumference of the second adjusting means 118. Thus, rotation of the second adjusting means 118 in either the direction of the arrow 186 or the direction of the arrow 188 causes the bias means channel base 160 of the bias means channel 158 to force the bias means 124 and 126, and thus, inner tube adjusting means 112 and the inner tube adjusting means 114, to move in the direction of the arrow 190 or in the direction of the arrow 192. The depth of the bias means channel 158 where the bias means 124 and 126 contacts the bias means channel base 160 determines which direction the bias means 124 and 126, and thus, the inner tube adjusting means 110 and 112, will move.

For example, in FIG. 10 of the drawings, both the bias means 124 and 126 contact the bias means channel base 160 at points closer to the shallow portion of the bias means channel 158. If the second adjusting means 118 were rotated in the direction of the arrow 188, the depth of the bias means channel 158 would decrease where the bias means 124 contacts the bias means channel base 160, the bias means 124 now being in the shallow portion of the bias means channel 158, and the depth of the bias means channel 158 would increase where the bias means 126 contacts the bias means channel base 160, the bias means 126 now being in the deep portion of the bias means channel 158, thereby moving the bias means 124 and 126, and thus, the inner tube adjusting means 112 and 114, respectively, in the direction of the arrow 190. Similarly, if the second adjusting means 118 were rotated in the direction of the arrow 186, the depth of the bias means channel 158 would increase where the bias means 124 contacts the bias means channel base 160, the bias means 124 now being in the deep portion of the bias means channel 158, and the depth of the bias means channel 158 would decrease where the bias means 126 contacts the bias means channel base 160, the bias means 126 now being in the shallow portion of the bias means channel 158, thereby moving the bias means 124 and 126, and thus, the inner tube adjusting means 112 and 114, respectively, in the direction of the arrow 192. Therefore, horizontal movement of the inner tube adjusting means 112 and 114 caused by the rotation of the eccentric bias means channel 158 formed in the second adjusting means 118 changes or adjusts the horizontal position or windage of the inner guide tube 54 within the scope outer tube 30, thereby adjusting the actual or apparent horizontal position or windage of the reticle. The reticle cannot be seen in FIG. 10 of the drawings but is clearly shown in FIGS. 3, 4 and 5 of the drawings and the end 102 of the inner guide tube 54 cannot be seen in FIG. 10 of the drawings but is clearly shown in FIGS. 7, 8 and 11 of the drawings.

Figure 11:
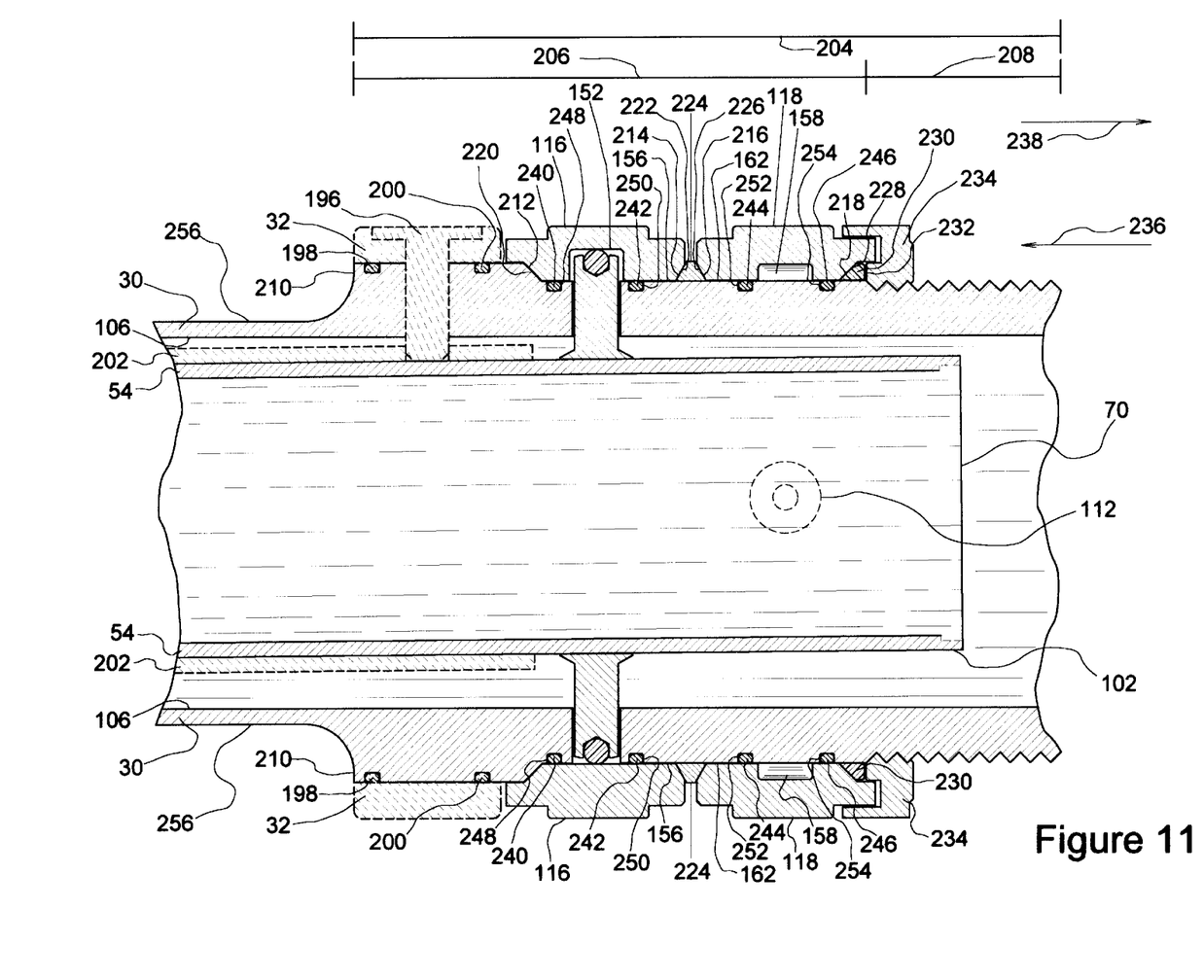
FIG. 11 is an enlarged partial cross sectional view of a portion of the sighting scope illustrated in FIG. 7.

Referring now to FIG. 11 of the drawings, there is shown an enlarged partial cross sectional view of the sighting scope 20 shown by the dashed circle 194 in FIG. 7. The scope eyepiece 34 and associated lens system 100, shown in FIG. 7, has been removed in FIG. 11 for purposes of clarity. Additionally, since the scope tube adjusting and locking device 88 may be positioned at alternate points along the scope outer tube 30, as previously described, the power adjusting ring 32, power adjusting ring link pin 196, power adjusting ring seals 198 and 200 and the power adjusting cam tube 202 are shown in dashed lines FIG. 11 for purposes of clarity. That is, in the Preferred Embodiment, the new and novel scope tube adjusting and locking device 88 is located on the scope outer tube 30 near the scope eyepiece 34 of the sighting scope, as previously described. This position may place the scope tube adjusting and locking device 88 adjacent to the power adjusting ring 32 and its associated mechanical adjusting components as illustrated in FIGS. 6, 7 and 11. However, since both the scope tube adjusting and locking device 88 and the power adjusting ring 32 can be alternately positioned along the scope outer tube 30, as shown in FIG. 8, the positioning of the scope tube adjusting and locking device 88 adjacent to the power adjusting ring 32 in FIG. 11 is provided for purposes of illustration only.

A thickened or enlarged portion of the scope outer tube 30 is illustrated by the numeral 204, the enlarged portion 204 having a non-threaded area illustrated by the numeral 206 and an adjacent threaded area illustrated by the numeral 208. The first adjusting means 116 rotatably encompasses part of the non-threaded area 206 of the enlarged portion 204 of the scope outer tube 30 near the end 210 of the thickened or enlarged portion 204. The bias means channel 152 is eccentrically formed in the first adjusting means 116, as previously described, and centrally disposed between an outer edge 212 and inner edge 214 of the first adjusting means 116. Similarly, in the Preferred Embodiment and in FIG. 11, the second adjusting means 118 rotatably encompasses part of the non-threaded area 206 of the enlarged portion 204 of the scope outer tube 30 adjacent to the first adjusting means 116, the second adjusting means 118 being positioned so that an inner edge 216 is oriented toward the inner edge 214 of the first adjusting means 116. The bias means channel 158 is eccentrically formed in the second adjusting means 118, as previously described, and is centrally disposed between the inner edge 216 and an outer edge 218 of the second adjusting means 118.

Retaining seat 220 is formed on the thickened or enlarged portion 204 of the scope outer tube 30 near the end 210 of the enlarged portion 204 and thus, near the end 210 of the non-threaded area 206. Outer edge 212 of the first adjusting means 116 contacts the retaining seat 220 while the inner edge 214 of the first adjusting means 116 contacts an edge 222 of expansion means 224, the expansion means 224 encompassing the thickened portion 204 of the scope outer tube 30 and being positioned between the first adjusting means 116 and the second adjusting means 118. An opposite edge 226 of the expansion means 224 contacts the inner edge 216 of the second adjusting means 118, while the outer edge 218 of the second adjusting means 118 contacts an edge 228 of locking ring 230. An opposite edge 232 of the locking ring 230 contacts locking means 234, the locking means 234 threadedly encompassing part of the threaded area 208 of the scope outer tube 30.

The locking means 234 is threadedly rotatable around the scope outer tube 30 so that the locking means 234 locks the scope tube adjusting and locking device 88 when tightened and unlocks the scope tube adjusting and locking device 88 when loosened. That is, when the locking means 234 is tightened, or rotated to move toward a locking position in the direction of the arrow 236, it applies pressure against the locking ring 230 which in turn applies pressure against the second adjusting means 118, the second adjusting means 118 then applying pressure against the expansion means 224, which in turn applies pressure against the first adjusting means 116, the first adjusting means 116 then applying pressure against the retaining seat 220. Once the locking means 234 has been tightened, the pressure created the between locking means 234 and the retaining seat 220 locks the first adjusting means 116 and the second adjusting means 118 in place and prevents rotation of the first adjusting means 116 and the second adjusting means 118. Thus, the vertical position, or elevation, of the inner guide tube 54 and the horizontal position, or windage, of the inner guide tube 54, are locked in the desired position. When the locking means 234 is loosened or rotated to move toward an unlocked position, in the direction of the arrow 238, the directional pressure against all of the intervening components between the retaining seat 220 and the locking means 234 is relieved and the first adjusting means 116 and the second adjusting means 118 can again be rotated to adjust or re-adjust the elevation and windage of the inner guide tube 54, as previously described.

In the Preferred Embodiment, the expansion means 224 is an expandable wedge split ring designed to exert outwardly radiating pressure on the inner edge 214 of the first adjusting means 116 and on the inner edge 216 of the second adjusting means 118. That is, since the expansion means 224 is a split ring, the split in the expansion means 224 allows the expansion means 224 to be compressed by the first adjusting means 116 and the second adjusting means 118 when the locking means 234 is in a locked position. In this compressed state, the expansion means 224 attempts to return to its original non-compressed state by exerting outwardly radiating pressure on the adjacent first adjusting means 116 and second adjusting means 118 forcing the outer edge 212 of the first adjusting means 116 into the retaining seat 220 and forcing the outer edge 218 of the second adjusting means 118 into the edge 228 of the locking ring 230. The outwardly radiating pressure exerted by the expansion means 224 on the first adjusting means 116 and on the second adjusting means 118 provides additional locking force when the scope tube adjusting and locking device 88 is in a locked position. In the Preferred Embodiment, the expansion means 224 is constructed from steel, hardened steel, stainless steel or other rigid metal alloys. Other materials and other expansion devices known in the art may also be used and are considered to be within the spirit and scope of the present invention.

Also in the Preferred Embodiment, the locking ring 230 is a serrated wedge ring designed to frictionally grip the outer edge 218 of the second adjusting means 118 and the locking means 234, thereby preventing accidental unlocking and mis-alignment of the inner guide tube 54. That is, since the locking ring 230 positively grips the second adjusting means 118 and the locking means 234 when the locking means 234 is in a locked or tightened position, accidental dropping or jarring of the sighting scope will not loosen the locking means 234 causing mis-alignment of the inner guide tube 54. Additionally, since any recoil from a discharged firearm generally travels in a longitudinal direction along the firearm, and thus, longitudinally along the sighting scope, and since the locking means 234 is threadedly locked in a plane perpendicular to the longitudinal force produced by recoil, repeated heavy recoils of the firearm using high powered ammunition, or in the case of air guns, the action of the spring that operates the air gun plunger or pistons, will not loosen the locking means 234, which would result in mis-alignment of the inner guide tube 54. In the Preferred Embodiment, the locking ring 230 is composed of a rigid synthetic material such as co-polymer propylene, ABS plastic, epoxy composites, polystyrene, polyester, acrylic and other rigid plastic polymers and plastic co-polymers. Other rigid materials may also be used and are considered to be within the spirit and scope of the applicant's invention.

A plurality of adjusting means seals 240, 242, 244 and 246 are circumferentially disposed around the scope outer tube 30 in a plurality of spaced apart seal channels 248, 250, 252 and 254, respectively, circumferentially formed in the outer surface 256 of the scope outer tube 30. Seal channels 248 and 250 are formed in the outer surface 256 of the scope outer tube 30 so that the adjusting means seals 240 and 242 disposed therein, respectively, contact the inner surface 156 of the first adjusting means 116 on either side of the bias means channel 152. That is, the seal channel 248 is positioned on the scope outer tube 30 so that the adjusting means seal 240 contacts the first adjusting means 116 between the outer edge 212 and the bias means channel 152, while the seal channel 250 is positioned on the scope outer tube 30 so that the adjusting means seal 242 contacts the first adjusting means 116 between the bias means channel 152 and the inner edge 214. Similarly, seal channels 252 and 254 are formed in the outer surface 256 of the scope outer tube 30 so that the adjusting means seals 244 and 246 disposed therein, respectively, contact the inner surface 162 of the second adjusting means 118 on either side of the bias means channel 158. That is, the seal channel 252 is positioned on the scope outer tube 30 so that the adjusting means seal 244 contacts the second adjusting means 118 between the inner edge 216 and bias means channel 158, while the seal channel 254 is positioned on the scope outer tube 30 so that the adjusting means seal 246 contacts the second adjusting means 118 between the bias means channel 158 and the outer edge 218.

The plurality of adjusting means seals 240, 242, 244 and 246 are slightly compressed in the channels 248, 250, 252 and 254, respectively, when the first adjusting means 116 and the second adjusting means 118 are positioned around them on the scope outer tube 30 and locked in position by the locking means 234. The first adjusting means 116 slightly compresses the adjusting means seals 240 and 242 while the second adjusting means 118 slightly compresses the adjusting means seals 244 and 246 providing efficient sealing of the sighting scope, thereby preventing the entry of moisture and contaminants into the sighting scope, and reducing the loss of dry nitrogen from the scope. The slight compression of the plurality of adjusting means seals 240, 242, 244 and 246 in the seal channels 248, 250, 252 and 254, respectively, provides efficient sealing of the internal components of the scope tube adjusting and locking device 88 while still allowing rotation of the first adjusting means 116 and the second adjusting means 118 around the scope outer tube 30. In the Preferred Embodiment, the adjusting means seals 240, 242, 244 and 246 are rubber or siliconized O-rings. Other seals and other sealing means known in the art may also be used and are considered to be within the spirit and scope of the present invention.

Also in the Preferred Embodiment, the thickened or enlarged portion 204 of the scope outer tube 30 provides suitable thickness and reinforcement for the formation of the retaining seat 220, seal channels 248, 250, 252 and 254, threads along the threaded area 208, and the bores 164, 166, 168 and 170. The bores 168 and 170 cannot be seen in FIG. 11, but are clearly shown in FIG. 10 of the drawings.

Figure 12:
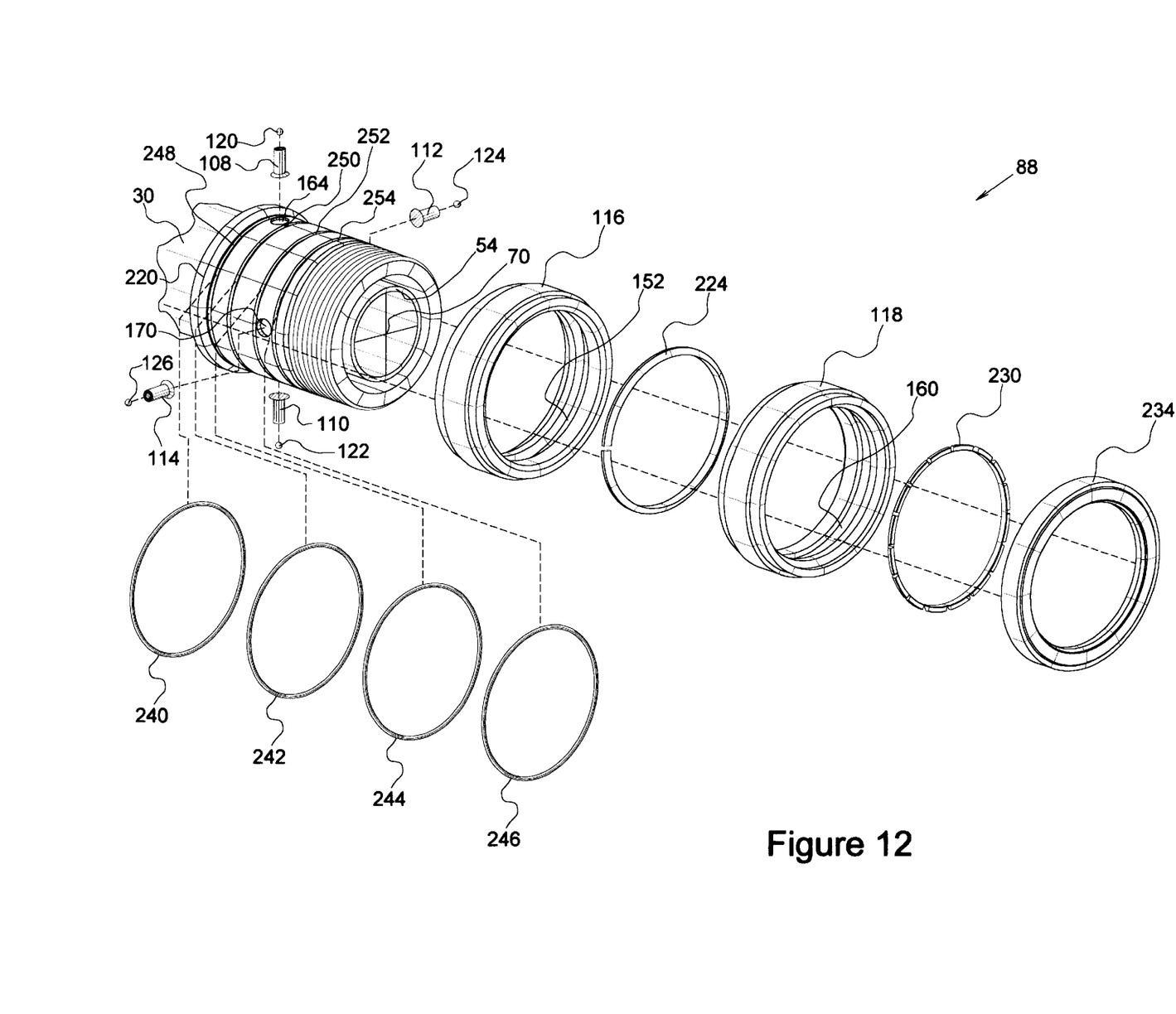
FIG. 12 is an exploded perspective view of the new and novel scope tube adjusting and locking device.

Referring now to FIG. 12 of the drawings, there is shown an exploded perspective view of the new and novel scope tube adjusting and locking device, shown generally by the numeral 88. Since the scope tube adjusting and locking device 88 and the power adjusting ring 32 along with its associated mechanical adjusting components, if present, can be positioned anywhere along the scope outer tube 30 as previously described and as shown in FIGS. 7 and 8 of the drawings, the power adjusting ring 32 and its associated component parts have not been illustrated in FIG. 12 for purposes of clarity. FIG. 12 of the drawings illustrates the orientation and relative positioning of the various components of the scope tube adjusting and locking device 88.

In general, the adjusting means seals 240, 242, 244 and 246 are circumferentially disposed in the seal channels 248, 250, 252 and 254, respectively, formed in the scope outer tube 30. The inner tube adjusting means 108, 110, 112 and 114 are laterally and movably disposed through the bores 164, 166, 168 and 170 from the inside of the scope outer tube 30, the bores 166 and 168 not visible in FIG. 12. The bias means 120, 122, 124 and 126 are rotatably cradled by the inner tube adjusting means 108, 110, 112 and 114, respectively. The first adjusting means 116 rotatably encompasses the scope outer tube 30 so that it contacts the adjusting means seals 240 and 242 and so that the bias means 120 and 122 are positioned in the bias means channel 152, the bias means 120 and 122 contacting and tracking the bias means channel base 154. The expansion means 224 encompasses the scope outer tube 30 and is positioned adjacent to and in contact with the first adjusting means 116. The second adjusting means 118 rotatably encompasses the scope outer tube 30 and is positioned adjacent to and in contact with the expansion means 224 so that it contacts the adjusting means seals 244 and 246 and so that the bias means 124 and 126 are positioned in the bias means channel 158, the bias means 124 and 126 contacting and tracking the bias means channel base 160. The locking ring 230 encompasses the scope outer tube 30 and is positioned adjacent to and in contact with the second adjusting means 118. Finally, the locking means 234 threadedly encompasses the scope outer tube 30 so that it contacts the locking ring 230 when tightened or rotated into a locking position.

The position of the inner guide tube is adjusted by rotation of the adjusting means 116 and 118 around the scope outer tube 30. That is, in the Preferred Embodiment, the vertical position of the inner tube adjusting means 108 and 110 is adjusted by rotating the first adjusting means 116, thereby adjusting the vertical position or elevation of the inner guide tube 54 longitudinally disposed between the inner tube adjusting means 108 and 110, as previously described. The horizontal position of the inner tube adjusting means 112 and 114 is similarly adjusted by rotating the second adjusting means 118, thereby adjusting the horizontal position or windage of the inner guide tube 54 longitudinally disposed between the inner tube adjusting means 108 and 110, as previously described. Thus, the actual or apparent elevation, or vertical position, of the reticle is adjusted by rotation of the first adjusting means 116 and the actual or apparent windage, or horizontal position, of the reticle is adjusted by rotation of the second adjusting means 118. Once the desired elevation and windage adjustment of the sighting scope has been achieved, the locking means 234 is tightened, or rotated to a locking position, to positively lock the inner guide tube 54 in the desired adjusted position.

From the above it can be seen that the new and novel scope tube adjusting and locking device accomplishes all of the objects and advantages presented herein before. Nevertheless it is within the spirit and scope of the invention that changes in the basic scope tube adjusting and locking device may be made and the Preferred Embodiment and the modifications shown and described herein have only been given by way of illustration.

Having described my invention, I claim:

1. A scope tube adjusting and locking device for use in a sighting scope having a scope outer tube, the scope outer tube having an inner guide tube longitudinally disposed therein, the scope outer tube also having an enlarged portion, the enlarged portion having a non-threaded area and an adjacent threaded area, the scope tube adjusting and locking device providing vertical and horizontal adjustment of the inner guide tube comprising:

a. adjusting means having bias means channels eccentrically formed therein rotatably encompassing the non-threaded area of the enlarged portion of the scope outer tube;

b. a plurality of bias means disposed in the bias means channels contacting and tracking the bias means channels;

c. a plurality of inner tube adjusting means having an end and an opposite end laterally and movably disposed through the non-threaded area of the enlarged portion of the scope outer tube, the opposite end rotatably cradling the plurality of bias means, the end contacting and adjusting the longitudinally disposed inner guide tube; and d. locking means threadedly encompassing the threaded area of the enlarged portion of the scope outer tube adjacent to the adjusting means, wherein the locking means rotatably locks the adjusting means when the inner guide tube has been adjusted to a desired position.

2. The scope tube adjusting and locking device as defined in claim 1 wherein the bias means channels are eccentrically formed in an inner surface of the adjusting means.

3. The scope tube adjusting and locking device as defined in claim 1 wherein the plurality of bias means contact and track a base of the bias means channels.

4. The scope tube adjusting and locking device as defined in claim 1 wherein the plurality of bias means are constructed from resilient material having an inherent memory.

5. The scope tube adjusting and locking device as defined in claim 4 wherein the inherent memory of the plurality of bias means produces biasing force against the plurality of inner tube adjusting means.

6. The scope tube adjusting and locking device as defined in claim 5 wherein the plurality of inner tube adjusting means transfer the biasing force against the inner guide tube.

7. The scope tube adjusting and locking device as defined in claim 1 wherein the locking means rotatably locks and unlocks the adjusting means, the adjusting means being rotated to adjust the vertical and horizontal position of the inner guide tube within the scope outer tube when the locking means is in an unlocked position.

8. A scope tube adjusting and locking device for use in a sighting scope, the sighting scope having an inner guide tube longitudinally disposed within a scope outer tube having an enlarged portion, the enlarged portion of the scope outer tube having a threaded portion, the scope tube adjusting and locking device providing vertical and horizontal adjustment of the inner guide tube, the scope tube adjusting and locking device comprising:

a. a first adjusting means, the first adjusting means rotatably encompassing a part of the enlarged portion of the scope outer tube and having a bias means channel eccentrically formed therein;

b. a second adjusting means, the second adjusting means rotatably encompassing another part of the enlarged portion of the scope outer tube adjacent to the first adjusting means and having a bias means channel eccentrically formed therein;

c. a plurality of inner tube adjusting means laterally and movably disposed through the scope outer tube, the inner tube adjusting means having an end and an opposite end, wherein the end contacts an outer surface of the inner guide tube;

d. a plurality of bias means rotatably disposed between the opposite end of the plurality of inner tube adjusting means and the bias means channel, the plurality of bias means tracking the bias means channel; and e. locking means threadedly encompassing the threaded portion of the enlarged portion of the scope outer tube, wherein the locking means rotatably locks the first adjusting means and the second adjusting means when the inner guide tube has been adjusted to a desired position and rotatably unlocks the first adjusting means and the second adjusting means allowing re-adjustment of the inner guide tube.

9. The scope tube adjusting and locking device as defined in claim 8 wherein the first adjusting means provides vertical adjustment of the inner guide tube and the second adjusting means provides horizontal adjustment of the inner guide tube.

10. The scope tube adjusting and locking device as defined in claim 8 wherein the bias means channel of the first adjusting means is eccentrically formed in an inner surface of the first adjusting means and opens toward the scope outer tube, and the bias means channel of the second adjusting means is eccentrically formed in an inner surface of the second adjusting means and opens toward the scope outer tube.

11. The scope tube adjusting and locking device as defined in claim 8 wherein the plurality of bias means contact and track a base of the bias means channel formed in the first bias means channel and a base of the bias means channel formed in the second bias means channel.

12. The scope tube adjusting and locking device as defined in claim 8 wherein the plurality of bias means are constructed from resilient material having an inherent memory.

13. The scope tube adjusting and locking device as defined in claim 12 wherein the inherent memory of the plurality of bias means produces biasing force against the plurality of inner tube adjusting means.

14. The scope tube adjusting and locking device as defined in claim 13 wherein the plurality of inner tube adjusting means transfer the biasing force against the inner guide tube.

15. A scope tube adjusting and locking device for use in a sighting scope, the sighting scope having a scope outer tube having an inner guide tube longitudinally disposed therein, the scope outer tube also having an enlarged portion, the enlarged portion having a non-threaded area and an adjacent threaded area, the scope tube adjusting and locking device providing vertical and horizontal adjustment of the inner guide tube comprising:

a. a first adjusting means, the first adjusting means rotatably encompassing a part of the non-threaded area of the enlarged portion of the scope outer tube and having a bias means channel eccentrically formed therein;

b. expansion means rotatably encompassing part of the non-threaded area of the enlarged portion of the scope outer tube adjacent to the first adjusting means and contacting the first adjusting means;

c. a second adjusting means, the second adjusting means rotatably encompassing a part of the non-threaded area of the enlarged portion of the scope outer tube adjacent to the expansion means and contacting the expansion means, the second adjusting means having a bias means channel eccentrically formed therein;

d. a locking ring rotatably encompassing part of the non-threaded area of the enlarged portion of the scope outer tube adjacent to the second adjusting means and contacting the second adjusting means;

e. locking means threadedly encompassing the threaded area of the enlarged portion of the scope outer tube adjacent to the locking ring and contacting the locking ring;

f. a plurality of inner tube adjusting means laterally and movably disposed through the non-threaded area of the enlarged portion of the scope outer tube, the inner tube adjusting means having an end and an opposite end, the opposite end having cradle means formed therein, wherein the end contacts an outer surface of the inner guide tube; and g. a plurality of bias means rotatably cradled by the cradle means, the plurality of bias means rotatably disposed in the bias means channel of the first adjusting means and in the bias means channel of the second adjusting means, the plurality of bias means tracking the bias means channel of the first adjusting means and the bias means channel of the second adjusting means, wherein rotation of the first adjusting means adjusts the vertical position of the inner guide tube within the scope outer tube and rotation of the second adjusting means adjusts the horizontal position of the inner guide tube within the scope outer tube, the first adjusting means and the second adjusting means being locked in place by the locking means when the desired vertical and horizontal position of the inner guide tube is achieved.

16. The scope tube adjusting and locking device as defined in claim 15 wherein the bias means channel of the first adjusting means is eccentrically formed in an inner surface of the first adjusting means and opens toward the scope outer tube, and the bias means channel of the second adjusting means is eccentrically formed in an inner surface of the second adjusting means and opens toward the scope outer tube.

17. The scope tube adjusting and locking device as defined in claim 15 wherein the plurality of bias means contact and track a base of the bias means channel formed in the first bias means channel and a base of the bias means channel formed in the second bias means channel.

18. The scope tube adjusting and locking device as defined in claim 15 wherein the plurality of bias means are constructed from resilient material having an inherent memory.

19. The scope tube adjusting and locking device as defined in claim 18 wherein the inherent memory of the plurality of bias means produces biasing force against the plurality of inner tube adjusting means.

20. The scope tube adjusting and locking device as defined in claim 19 wherein the plurality of inner tube adjusting means transfer the biasing force against the inner guide tube.

* * * * *